United States Patent [19]
Rasmussen

[11] Patent Number: 5,231,636
[45] Date of Patent: Jul. 27, 1993

[54] ASYNCHRONOUS GLITCHLESS DIGITAL MUX

[75] Inventor: Richard R. Rasmussen, Fremont, Calif.

[73] Assignee: National Semiconductor Corporation, Santa Clara, Calif.

[21] Appl. No.: 759,469

[22] Filed: Sep. 13, 1991

[51] Int. Cl.[5] ............................................. H04J 3/00
[52] U.S. Cl. ................................ 370/100.1; 370/112; 375/100
[58] Field of Search .................. 370/100.1, 112, 108; 328/104; 307/243; 375/100; 455/133, 136

[56] References Cited

U.S. PATENT DOCUMENTS

| | | | |
|---|---|---|---|
| 4,310,922 | 1/1982 | Lichtenberger et al. | 370/84 |
| 4,635,249 | 1/1987 | Bortolini et al. | 370/100.1 |
| 4,965,524 | 10/1990 | Patchen | 307/243 |
| 4,988,901 | 1/1991 | Kamuro et al. | 328/104 |
| 5,099,141 | 3/1992 | Utsunomiya | 328/104 |

Primary Examiner—Douglas W. Olms
Assistant Examiner—Min Jung
Attorney, Agent, or Firm—Jacques M. Dulin; Thomas C. Feix

[57] ABSTRACT

Circuit and method of glitchless switching between asynchronous data inputs to a digital multiplexer (MUX) by maintaining and conditioning the width of the clock pulse corresponding to a first data input signal so that an output pulse is produced having a pulse width that is never narrower than the narrowest of input signals, i.e., does not produce a narrow-pulse glitch. The circuit comprises select inputs in parallel to both a MUX via a select latch device and to an edge detector having an output pulse triggering a synchronization assembly. The synchronization assembly freezes the output in the last state received from the multiplexer. The select input edge detector freezes the original D0 input at a high state until the new input D1 is cleared through the synchronization assembly.

7 Claims, 3 Drawing Sheets

ASYNCHRONOUS GLITCHLESS DIGITAL MUX

FIELD

The present invention relates generally to methods and apparatus for switching between asynchronous inputs of a digital multiplexer (MUX) without causing a glitch in the output. In particular, the invention relates to methods and apparatus for glitchless switching between asynchronous inputs of a digital multiplexer whereby the width of the output corresponds to the width of the selected input signal, and never produces an output pulse that is narrower than the narrowest of the input signals pulse width.

BACKGROUND

A digital multiplexer (MUX) is a device which contains one output, two or more data inputs and one or more select inputs. It has a wide variety of uses in electronics. Generally, the number of data inputs is equal to $2^n$ where n = the number of select inputs. For example, a 4-input MUX would require 2 select inputs because there are 4 possible binary states using two lines. A truth table for a 4-input MUX is shown below:

TABLE I

| Select Inputs | | Data Inputs[a] | | | | Outputs |
|---|---|---|---|---|---|---|
| S1 | S0 | D3 | D2 | D1 | D0 | Y |
| 0 | 0 | X | X | X | 0 | 0 |
| 0 | 0 | X | X | X | 1 | 1 |
| 0 | 1 | X | X | 0 | X | 0 |
| 0 | 1 | X | X | 1 | X | 1 |
| 1 | 0 | X | 0 | X | X | 0 |
| 1 | 0 | X | 1 | X | X | 1 |
| 1 | 1 | 0 | X | X | X | 0 |
| 1 | 1 | 1 | X | X | X | 1 |

[a] X = don't care

One characteristic of a standard digital MUX is that once the select input(s) change, the output will begin to reflect the newly selected data input as soon as the select input propagates through the internal logic. If the data input signals being selected are asynchronous to each other, the output pulse width may be narrower than the narrowest data input pulse width. This is called a "glitch". This causes significant problems in digital systems because a sub-minimum pulse width can violate the timing specification and requirements for other elements in the system causing a variety of operational malfunctions which may range from transitory to more permanent crashes.

Accordingly, there is a need for smooth, glitchless switching between asynchronous digital inputs to a multiplexer.

THE INVENTION

Objects

It is among the objects of the invention to improve the switching characteristics of circuits employing digital multiplexer devices.

It is another object to provide an improved circuit and method for reducing glitches in switching between asynchronous data inputs to multiplexer devices.

Still other objects will be evident from the specification, drawings and claims.

SUMMARY

Circuit and method of glitchless switching between asynchronous data inputs to a digital multiplexer (MUX) by maintaining and conditioning the width of the clock pulse corresponding to a first data input signal so that an output pulse is produced having a pulse width that is never narrower than the narrowest of input signals, i.e., does not produce a narrow-pulse glitch.

The circuit comprises select inputs in parallel to both a MUX via a select latch device having parallel latches, and to an edge detector having an output pulse triggering a synchronization assembly. The synchronization assembly comprises a first latch (LTCH 1) upstream of a shift register (flip-flop array) having a Q bar output which disables an output latch (LTCH 2) to freeze its output in the last state received from the multiplexer. That latch (LTCH 2) and the shift register array are connected to the multiplexer output in parallel. The select input edge detector freezes the original D0 input at a high state until the new input D1 is cleared through the shift register array and second latch.

The Q output from the shift register array is also fed back via a node to the select latch device (bubble inputs of the parallel internal latches) having Q outputs to the multiplexer, to complete the switchover from the original input D0 to the new frequency input D1. The Q bar output signal from the shift register array is also fed to the second latch to re-open the latch gate to complete the synchronization to the D1 input, and fed back to the first latch of the synchronization assembly to clear the shift register for the next select signal state change.

The edge detector includes a pair of exclusive NOR gates, each having an input series of gate delay inverters. The outputs from these exclusive NOR gates input to an OR gate, the output of which, in turn, feeds the LTCH 1 input.

DRAWING

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

Figure 1:
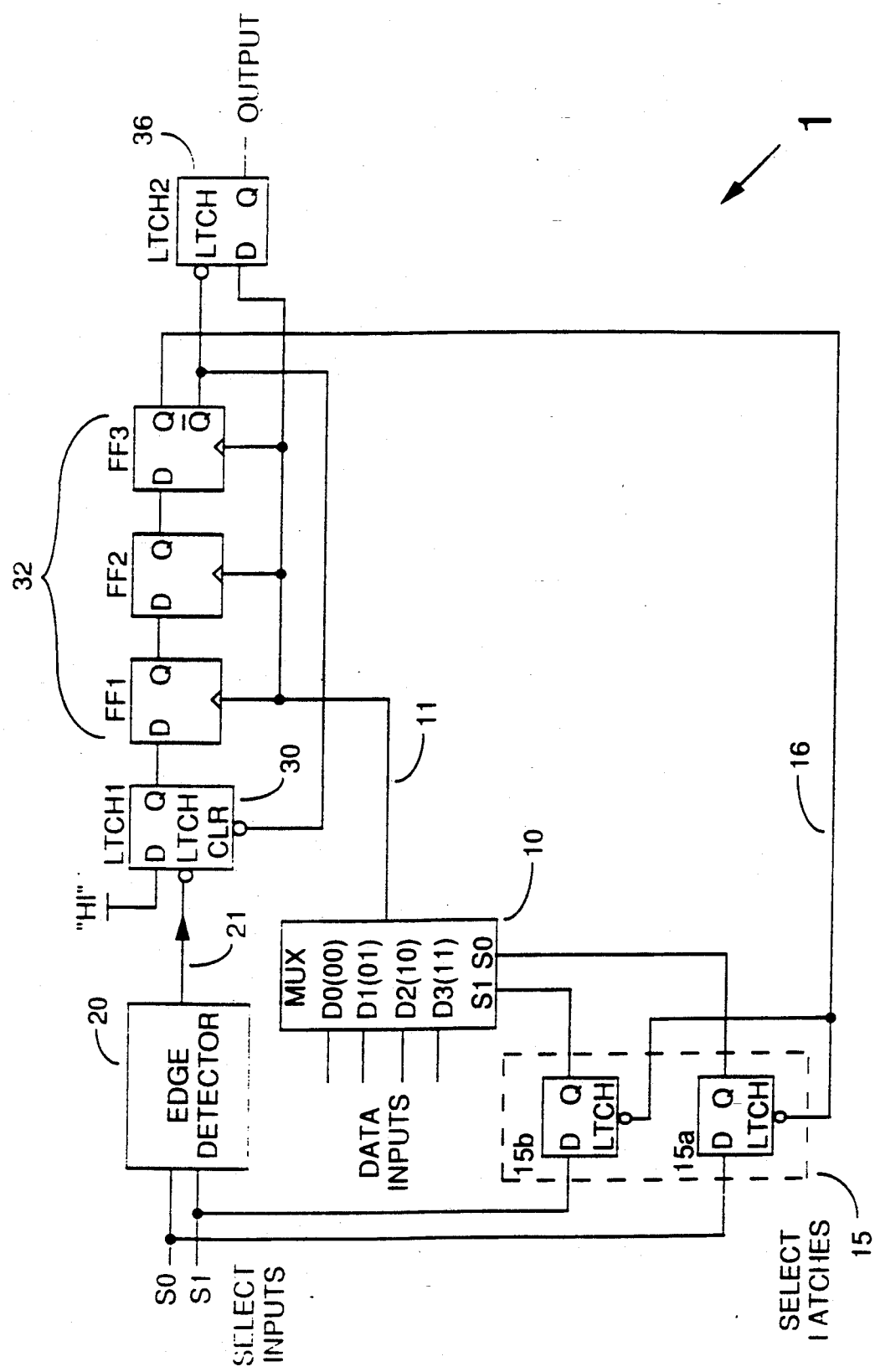
FIG. 1 is a schematic diagram illustrating an embodiment of an asynchronous glitchless digital MUX in accordance with the present invention.

FIG. 1 is a schematic diagram illustrating an asynchronous glitchless digital multiplexer (MUX) circuit constructed in accordance with one embodiment of the present invention, generally designated by reference numeral 1.

The circuit 1 comprises a digital multiplexer 10 including a selector or edge detector 20, select latches device 15, a first latch 30 (LTCH 1), a shift register (flip flop array) 32, and a second latch 36 (LTCH 2).

In this example, the multiplexer 10 is a standard four channel MUX having data inputs D0, D1, D2 and D3 which correspond to the four binary states (00, 01, 10 and 11) associated with the two select input signals S0 and S1. It is understood, however, that the invention may operate with any number of asynchronous select input signals so long as the appropriate number of channels is provided to the multiplexer.

Figure 2:
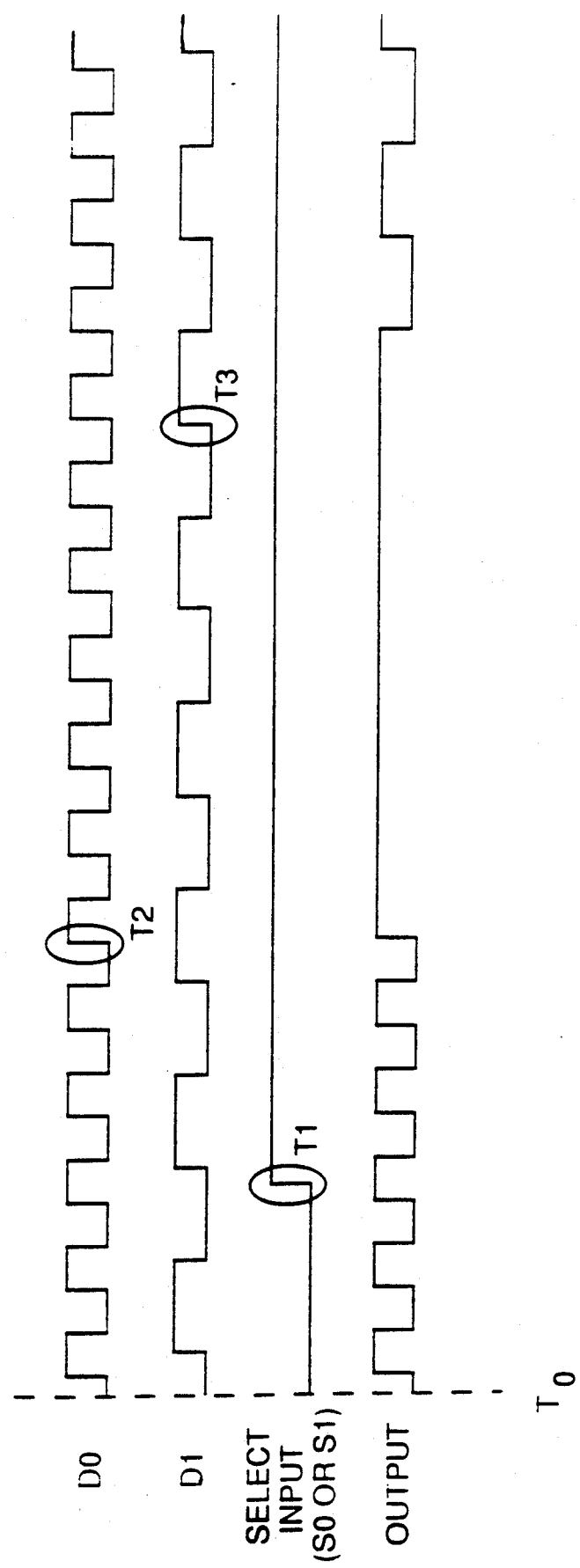
FIG. 2 is a timing diagram illustrating the freezing of the output signal which occurs when a selection between asynchronous data inputs is made.

FIG. 2 is a timing diagram which shows how the clock output of the asynchronous glitchless digital MUX circuit of this invention responds to changes in the selection of inputs from a high frequency data input D0 to a low frequency data input D1, and vice versa. For purposes of illustration, consider that data input corresponding to D0, a high frequency clock signal, is selected at time T0 by the MUX 10 (see FIG. 1) which generates a high frequency output signal at line 11. Line 11 is connected to each of the clock inputs of the three Flip Flops (FF 1, FF 2, FF 3) of shift register 32 and is also connected in parallel to the switching control signal D of the second latch 36 (LTCH 2).

For ease and simplicity of implementation, the shift register 32 is constructed of three D-type flip flops. It is understood that adequate synchronization may also be achieved by the provision of fewer flip flop memory devices. However, it should be noted that metastable conditions may occur in a single flip flop configuration since there exists a high probability that the shifting between two asynchronous data inputs during a given clock cycle will create a sudden high or low pulse which is narrower than the narrowest of the two data inputs, thus making the state of a single flip flop unknown during that clock cycle. The provision of a second and preferably a third flip flop downstream of the first flip flop ensures that this metastable condition is overcome so that the appropriate high and low signals are cascaded to the non-inverting (Q) and inverting (Q bar) outputs of the last Flip Flop (FF3).

As seen by tracing the circuit when there is no change in the state of the selected inputs S0 or S1, the second latch 36 (LTCH 2) becomes transparent. Thus, an open gate is formed, and whatever signal is output from the multiplexer 10 on line 11 is received at the D input of latch 36 and is transmitted to its Q output. Thus, as is seen in FIG. 2, from time T0 to the instant of time just before T1, the output signal follows the input signal D0. In the present example, the output signal corresponds to the high frequency input of D0. Once a change in the state of one of the select inputs S0 or S1 has occurred at T1 (e.g., a change from D0 to D1), the edge detector 20 senses an edge on either of the selected inputs and generates a positive pulse at line (hard wire) 21. This positive pulse causes the latching of a binary 1 at the Q output of latch 30 (LTCH 1). The status of the latch remains at 1 until the first latch is cleared by receiving a binary 0 at its active input (denoted CLR in FIG. 1). In the present example, the first latch 30 is not relatched (cleared back to its original state), since in this example, once the selected inputs have been switched they remain constant until another change in the state of the select inputs has been made.

Synchronizing operation is accomplished by clocking 1's across shift register 32 in order to disable the currently selected data input. (D0 in the present example). This is accomplished by latching a 1 at the Q output of first latch 30, which, in turn, registers a 1 at input D of the first Flip Flop (FF 1). 1's are then shifted across the remaining flip flops in response to the clock signal transmitted from multiplexer 10.

When a 1 is finally clocked at the input of Flip Flop 3, output Q registers high and this signal is directed via node 16 to a latch input of select latches device 15. As seen by tracing the two parallel internal latches 15a and 15b, a high signal at the latch input opens the select latches 15 device and allows the new select state (01) to come through to the multiplexer 10. This is represented graphically as occurring at time T2 in FIG. 2. Simultaneously, the low signal at the inverting or Q-bar output of Flip Flop 3 is transmitted to the latching control input of the second latch 36 (LTCH 2). This results in the disabling of the second latch 36. The output Q of latch 36 is frozen in the last state received from the multiplexer 10 at the input D. This is represented graphically at the time period from T2 to T3 in FIG. 2.

The Q bar output of Flip Flop 3 is also simultaneously fed back to the clearing input of latch 30 (LTCH 1), which, in turn, clears the shift register 32 by cascading 0's through the Flip Flops (FF1-FF3) synchronous to the newly selected data input (D1 in this example). When the shift register 32 has been cleared, the Q output at Flip Flop 3 now registers low (Q bar is now high) and this sends a 0 to the latch inputs of latches 15a and 15b to disable select latches device 15 and to complete the switchover to low frequency input D1. The signal of Q-bar of Flip Flop 3 re-enables latch 36, thus opening the gate between output D and output Q of latch 36. This completes the synchronization of the output signal and corresponds to time T3 of FIG. 2.

Note that the output signal of latch 36 becomes unfrozen at the beginning of the third signal period (cycle) of the new selected data input, D1. As is evident from the above description, the present circuit 1 conditions the pulse width of the output signal to ensure that it is never narrower than the narrowest input signal. This technique avoids causing the digital logic to be misclocked and thereby annoying glitches are never perceived by the user.

The present invention is suitable for use in selecting the output signal in a programmable clock generator. In addition to the CMOS devices described in FIGS. 1 and 3, the invention may also be easily used in other technologies depending on the desired implementations including, but not limited to CMOS, TTL and ECL devices.

Figure 3:
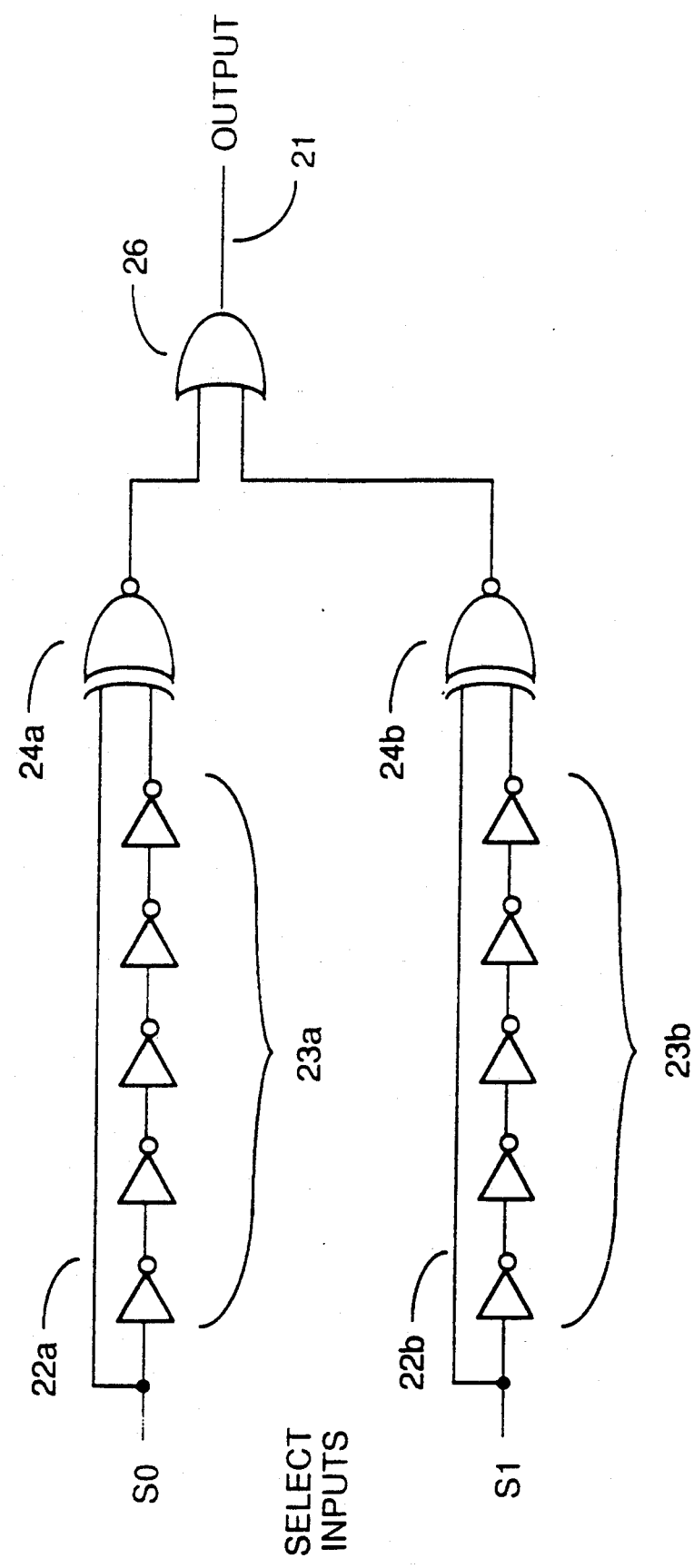
FIG. 3 is a logic diagram of the edge detector of FIG. 1.

As is best seen in FIG. 3 an embodiment for the edge detector 20 logic is shown. The logic design for edge detector 20 is preferably made up of logic cells having a specific gate delay which are selectively arranged in a logic sequence to achieve the desired output pulse width in accordance with the invention. In the present example, select input S0 is connected to an exclusive NOR gate 24a by a first input of five serially connected inverters 23a, and a second branching input 22a. Similarly, selected input S1 is connected to exclusive NOR gate 24b by a first input of five serially connected inverters 23b, and a branching input 22b. The outputs of exclusive NOR gates 24a and 24b are, in turn, input to NOR gate 26. This logic design generates a positive pulse or binary 1 at line 21, in response to a positive or negative edge at either of the selected inputs, S0 or S1. This, in turn, latches a logic 1 at the output of latch 30 to begin synchronization through the cascading of 1's across the shift register 32.

It should be understood that various modifications within the scope of this invention can be made by one of ordinary skill in the art without departing from the spirit thereof. I therefore wish my invention to be defined by the scope of the appended claims in view of the specification as broadly as the prior art will permit.

I claim:

1. A digital circuit for glitchless switching between two or more asynchronous data inputs to generate a properly clocked output pulse comprising:
   a) a digital multiplexer, said multiplexer having a plurality of data inputs corresponding to the binary state combinations of a provided plurality of asynchronous data select inputs;
   b) an edge detector for sensing a change in state of said select inputs to generate a positive output pulse and for selecting information into said digital multiplexer;
   c) a first latching means responsive to said pulse generated by said edge detector;
   d) means for synchronizing the signal frequency of a first newly selected data input having a particular frequency with a previously selected data input of a different frequency, said means for synchronizing having inputs responsive to both an output signal of said first latching means said multiplexer clock signal and having two intermediate outputs including a noninverting output and an inverting output; and
   e) a second latching means for latching a data input selected by said edge detector to said multiplexer, said second latching means including a latching control responsive to said noninverting output of said synchronizing means.

2. A digital circuit for glitchless switching of asynchronous data inputs as in claim 1 wherein:
   a) said first latching means includes an active input responsive to said inverting output of said synchronizing means, said active input permitting clearing of said synchronizing means when said inverting output is slow.

3. A digital circuit for glitchless switching of asynchronous data inputs as in claim 2 wherein;
   a) said means or synchronizing includes at least one flip flop producing said non-inverting and said inverting outputs;
   b) said flip flop includes a dynamic clock input connected to said multiplexer; and
   c) said means for synchronizing includes a third latching means having a data input responsive to said multiplexer clock signal and a latching control input responsive to said inverting output of said synchronizing means wherein:
      i) said multiplexer clock signal input of said third latching means is directly transmitted through said third latching means as output when said inverting output of said synchronizing mean is high; and
      ii) said third latch output is frozen at a last received state at said third latch data input when said inverting output of said synchronizing means is low.

4. A digital circuit for glitchless switching of asynchronous data inputs as in claim 3 wherein for each select input said edge detector comprises logic means having a desired gate delay for generating an output signal having a sufficient positive pulse width to latch a high signal to said first latch.

5. A digital circuit for glitchless switching of asynchronous data inputs as in claim 3 wherein:
   a) said synchronizing means includes a plurality of flip flops connected in series, the last of which produces said non-inverting and said inverting outputs.

6. A digital circuit for glitchless switching of asynchronous data inputs as in claim 5 wherein:
   a) there are three flip flops in series between said first and third latching means.

7. A method of switching between asynchronous data inputs in a digital system without causing a glitch in the output comprising the steps of:
   a) generating a positive pulse responsive to a change in state of select data input;
   b) multiplexing data inputs corresponding to selected data signals; and
   c) synchronizing a newly selected data signal with a previously selected data signal of a different frequency responsive to a clock signal of said multiplexer to condition the output signal to be no narrower than the narrowest of the two inputs.

* * * * *